(12) United States Patent
Wollner

(10) Patent No.: US 6,783,001 B2
(45) Date of Patent: Aug. 31, 2004

(54) MAGAZINE WITH A MAGAZINE STRIP FOR A SCREWDRIVER

(75) Inventor: Markus Wollner, Schotten (DE)

(73) Assignee: Ahorn Geräte- und Wekzeuge-Vertriebs GmbH, Hungen (DE)

(*) Notice: Subject to any disclaimer, the term of this patent is extended or adjusted under 35 U.S.C. 154(b) by 16 days.

(21) Appl. No.: 09/958,073

(22) PCT Filed: Feb. 2, 2001

(86) PCT No.: PCT/DE01/00433
§ 371 (c)(1),
(2), (4) Date: Jan. 9, 2002

(87) PCT Pub. No.: WO01/56748
PCT Pub. Date: Aug. 9, 2001

(65) Prior Publication Data
US 2002/0157976 A1 Oct. 31, 2002

(30) Foreign Application Priority Data
Feb. 4, 2000 (DE) .................. 200 02 058 U

(51) Int. Cl.$^7$ .............................................. G65D 85/24
(52) U.S. Cl. .................. 206/338; 206/347; 206/713; 227/107; 411/443
(58) Field of Search ................ 206/347, 338, 206/340–346, 230, 820, 713–717; 227/107, 135, 136, 139; 411/442, 443; 428/119

(56) References Cited

U.S. PATENT DOCUMENTS

| | | | |
|---|---|---|---|
| 2,784,405 A | | 3/1957 | Working, Jr. |
| 3,904,032 A | * | 9/1975 | Maier .................. 206/347 |
| 4,033,456 A | * | 7/1977 | Wion et al. ............ 206/347 |
| 4,139,036 A | | 2/1979 | Regan et al. |
| 4,301,921 A | * | 11/1981 | Petuch ................. 206/713 |
| 4,351,435 A | * | 9/1982 | Elwert et al. .......... 206/379 |
| 4,478,112 A | * | 10/1984 | Moulton ............... 81/57.37 |
| 4,821,877 A | * | 4/1989 | Aab et al. ............. 206/338 |
| 5,303,620 A | | 4/1994 | Payne et al. |
| 5,308,675 A | * | 5/1994 | Crane et al. ........... 428/120 |
| 5,890,405 A | * | 4/1999 | Becker ................. 81/434 |
| 6,044,972 A | * | 4/2000 | Rohrmoser et al. ...... 206/347 |
| 6,173,836 B1 | * | 1/2001 | Cooper ................. 206/346 |

FOREIGN PATENT DOCUMENTS

| | | |
|---|---|---|
| CH | 676567 | 5/1989 |
| DE | 3831625 | 5/1989 |
| EP | 0248101 | 12/1987 |
| EP | 0593970 | 4/1994 |
| WO | 9309918 | 5/1993 |
| WO | 9509705 | 4/1995 |

* cited by examiner

*Primary Examiner*—Jila M. Mohandesi
(74) *Attorney, Agent, or Firm*—Crowell & Moring LLP

(57) ABSTRACT

A magazine for a screwdriver. The magazine is provided with a magazine strip used to store screws which can be successively inserted into and extracted from an object. The magazine strip has a central web and a flange running along each edge. The magazine has a guide made up of a guiding part with a guiding slit on each side of the magazine strip. The guiding part is dimensioned in such a way that the enlargement extends respectively in positive fit outside the guiding part when the belt piece is inserted into the guiding slit.

4 Claims, 1 Drawing Sheet

MAGAZINE WITH A MAGAZINE STRIP FOR A SCREWDRIVER

Figure 1:
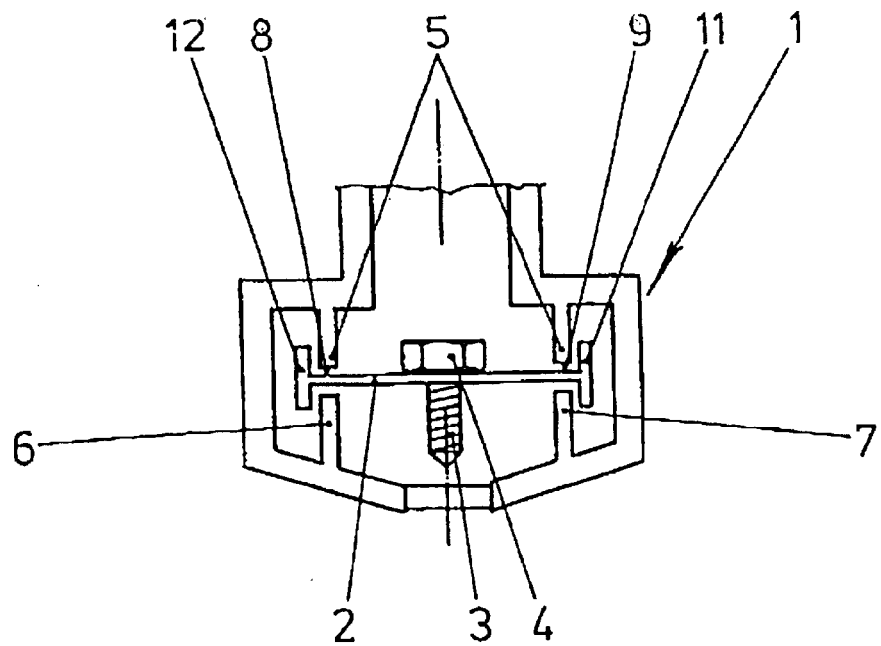

The invention relates to a magazine for a screwdriver, with a magazine tape, which is adapted to the screwdriver, for storing screws, which can be pressed out successively by means of the screwdriver and screwed into the intended objects, the magazine having a guide for the edges of the magazine tape.

At the present time, magazine tapes for screwdrivers are constructed as flat belt tapes and have consecutive openings, into which is to be stored, is inserted. The guide is formed appropriately by two slots, which extend parallel to one another and are engaged by the belt tape with its flat edges. Such magazines and magazine tapes have proven their value in the case of countersunk screws. Countersunk screws have heads with a conical underside. For this reason, the screws with their heads can be pressed with relatively low forces out of the openings in the magazine tape.

If screws, such as hexagon head cap screws, the underside of which is flat, are stored in a magazine tape, relatively high forces are required to press the screws out of the magazine tape, because the whole surface of the screw heads rests on the magazine tape. For this reason, the magazine tape must be constructed sturdily, so that, when the respective screw is pressed out, the magazine is not bent to such an extent, that it slips out of the guide of the magazine. A stable construction of the belt tape admittedly counteracts the danger of bending the belt tape; however, at the same time, it increases the forces required for pressing the respective screw out of its opening, if the latter is not configured extravagantly.

It is an object of the invention to provide a magazine and a magazine tape of the type named above so that, when the respective screw is pressed out of the magazine tape, there is no danger that the magazine tape will bend to such an extent, that it can get out of its guide.

Pursuant to the invention, this object is accomplished owing to the fact that the magazine tape consists of a flat belt part and a thickening, which extends along the edges, and, at each side of the magazine tape, the guide has a guide part with a guide slot and the dimensions of this guide part are such, that the thickening in each case extends positively on the outside of the guide part, when the belt part is inserted in the guide slot.

Due to this configuration, the magazine tape is clamped positively in the guiding parts transversely to the transporting direction. It can therefore not get out of the guiding parts even when large compressive forces are exerted on the screws and the flat belt part is constructed with very thin walls. It is therefore possible to construct the belt part so thin that, when the openings are shaped very simply, very small forces are required for pressing the screw heads through the openings in spite of the fact that the screw heads are flat. The inventive magazine can therefore be configured very simply and requires less material than the previous customary magazine tapes. Since the magazine tape, after it has been used, represents waste, the savings in material are of great importance, so that the inventive magazine tape can also be used to advantage in the case of screws with a countersunk head.

The thickening could also be formed by two bulges at either side of the magazine tape. However, it is particularly advantageous if the thickening is formed in each by one cross member, which forms a double T-shaped profile with the belt part. Such a magazine tape can be guided particularly well in the guide of the magazine and requires only little strength.

The guide for the magazine advantageously is constructed as a T-shaped groove at each side of the magazine tape.

Figure 2:
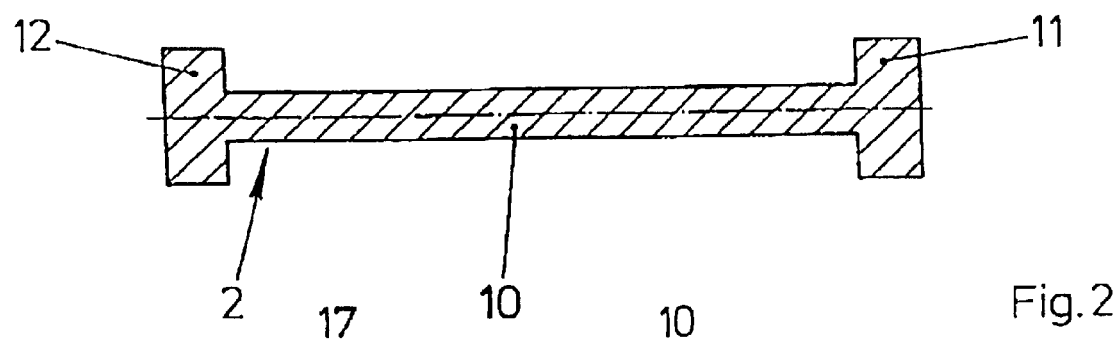
Figure 3:
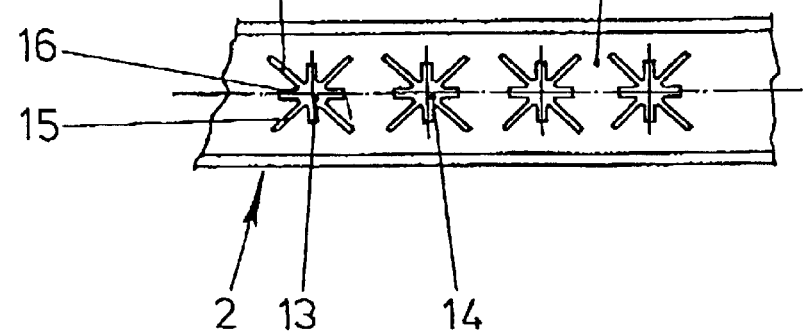

The invention permits different embodiments, one of which is described in the following and shown in the drawing in which FIG. 1 shows a section through a lower region of a magazine for a screwdriver with inserted magazine tape, FIG. 2 shows a cross section through the magazine tape on a much enlarged scale compared to FIG. 1 and FIG. 3 shows a plan view of the magazine tape.

FIG. 1 shows a lower region of a magazine 1, through which a magazine tape 2 with screws 3 is passed. These screws 3 in each case have a hexagonal head 4, the underside of which is flat, as is customary with such hexagonal heads. The magazine tape 2 is guided in the magazine 1 by means of a guide 5, which has a guide part 6, 7 with a guide slot 8, 9 at each side of the magazine tape 2.

FIG. 2 shows that the magazine tape 2 is formed from a flat belt part 10 with, in each case, a thickening 11, 12 at its edge. In the case of the embodiment shown, the thickenings 11, 12 are formed in each case as a cross member extending transversely to the plane of the belt part 10. Together with the belt part 10, these cross members from a double T-shaped profile.

FIG. 3 shows that openings 13, 14 are provided one behind the other in the belt part 10 of the magazine tape 2. In each case, one of the screws 3, shown in FIG. 1, is stored in the openings 13, 14, which have star-shaped incisions 15, 16, 17, so that the screws 3, with their hexagonal heads 4, can be pressed relatively easily through the openings 13, 14.

As shown in FIG. 1, the magazine tape 2 passes through the magazine 1, so that the thickenings 11, 12 are on the outside of the guide part 6, 7. As a result, the magazine tape 2 cannot get out of the guide 5 even if relatively high forces are exerted on the respective hexagonal head 4.

List of Reference Symbols 1. magazine
2. magazine tape
3. screw
4. hexagonal head
5. guide
6. guide part
7. guide part
8. guide slot
9. guide slot
10. belt part
11. thickening
12. thickening
13. opening
14. opening
15. incision
16. incision
17. incision

What is claimed is:

1. A magazine comprising a magazine tape adapted to store screws to be fed to a screwdriver, which screws can be pressed out successively by the screwdriver and screwed into the intended objects, and a guide for the magazine tape, the magazine tape comprising a web having a pair of opposed longitudinal edges and a flange extending along each edge, the flanges each comprising a cross-member which, together, form an I-shaped profile with the web; and the guide comprising spaced apart opposed guide members defining a guide slot, the space between the spaced apart opposed guide members being such that the flanges lie outside of the guide members when the magazine tape is inserted in the guide slot, to thereby secure the carrier tape from disengaging from the guide slots when the screws are pressed out of the carrier tape.

2. The magazine of claim 1, wherein the guide is formed as a T-shaped groove at each side of the magazine tape.

3. The magazine of claim 1, wherein the magazine tape further comprises a plurality of longitudinally spaced apart openings adapted to support screws in the rape for storage such that the screws may be pushed out of said openings.

4. The magazine of claim 3, wherein the openings are formed of star-shaped incisions.

* * * * *